C. E. EVANS.
BINDING AND TYING MACHINE.
APPLICATION FILED FEB. 19, 1915. RENEWED OCT. 4, 1916.
1,324,039.
Patented Dec. 9, 1919.
7 SHEETS—SHEET 4.
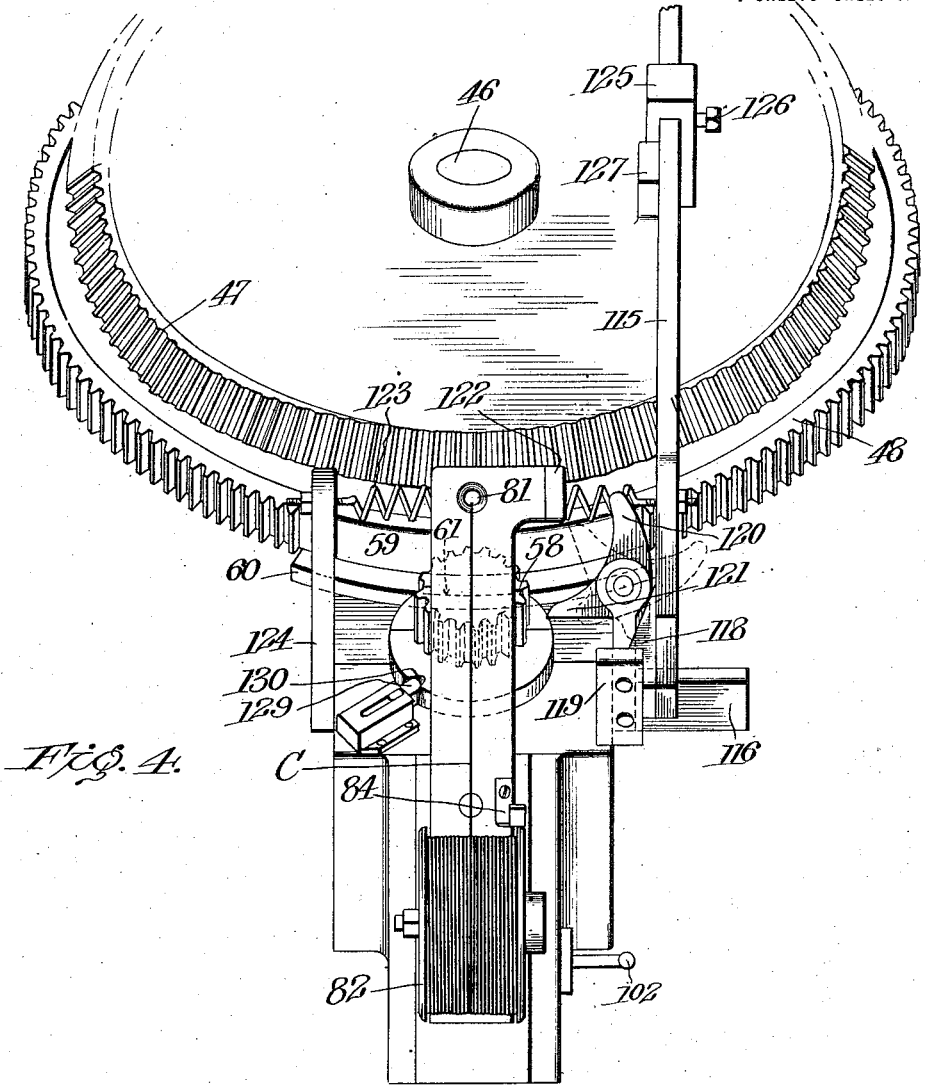
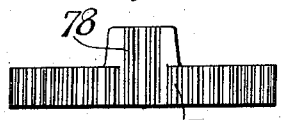

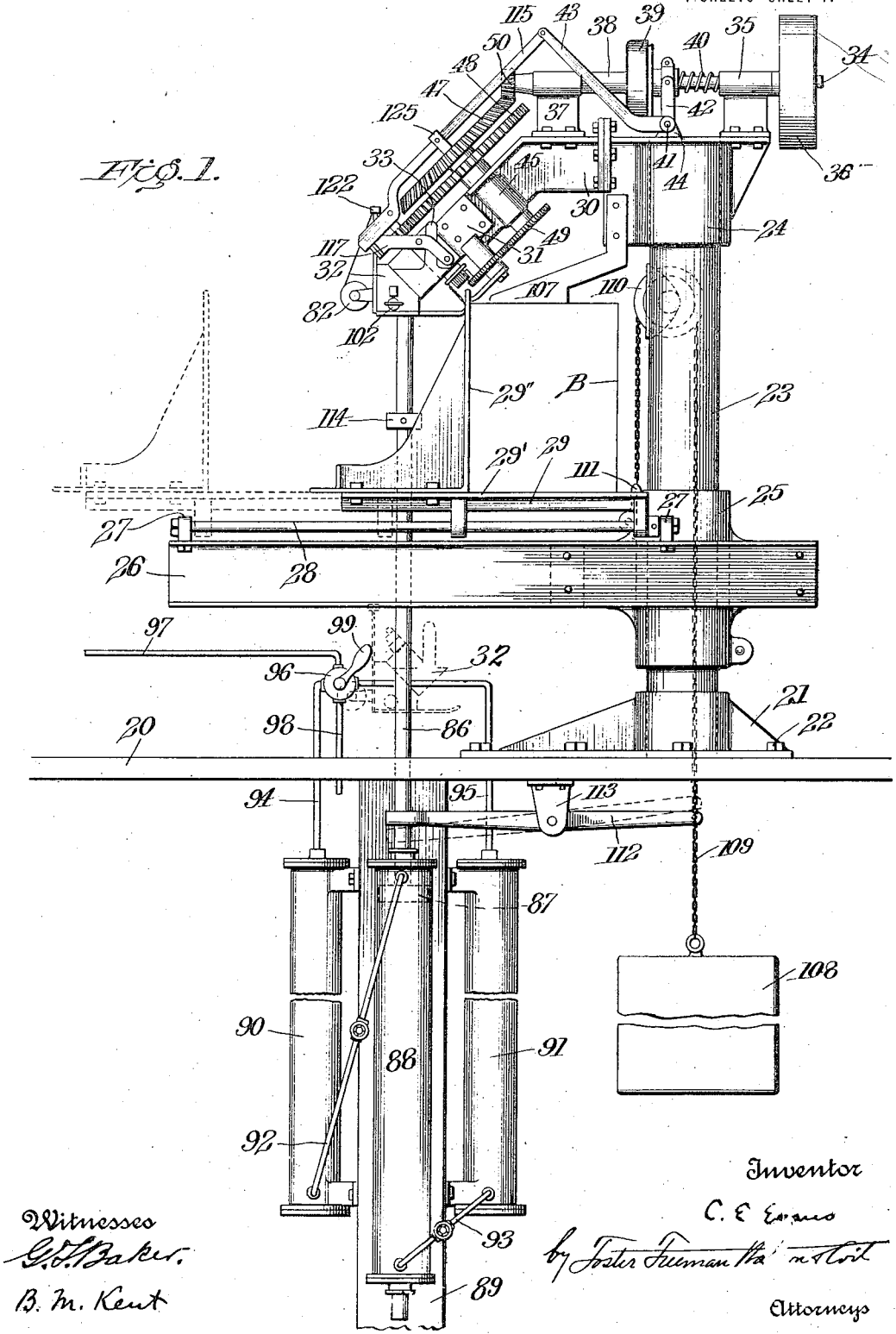

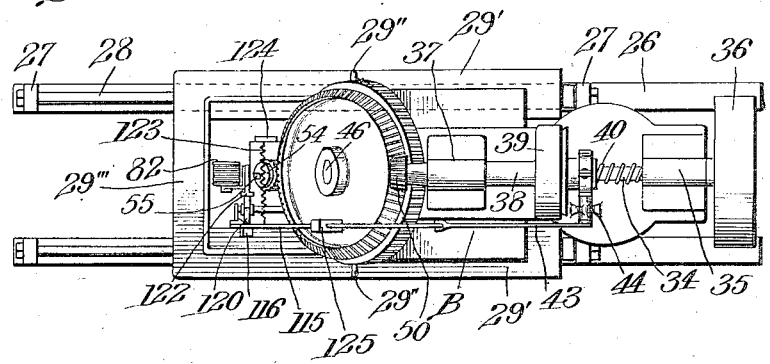
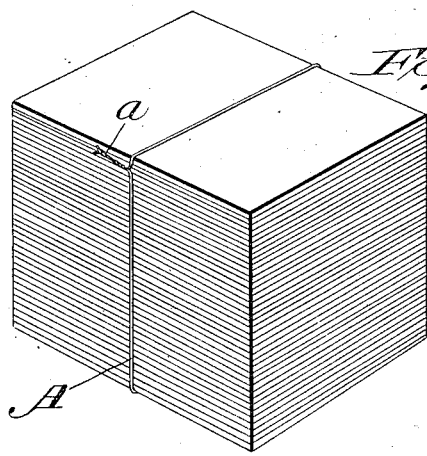
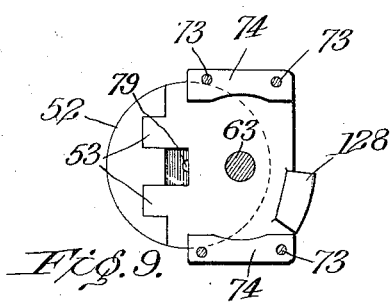

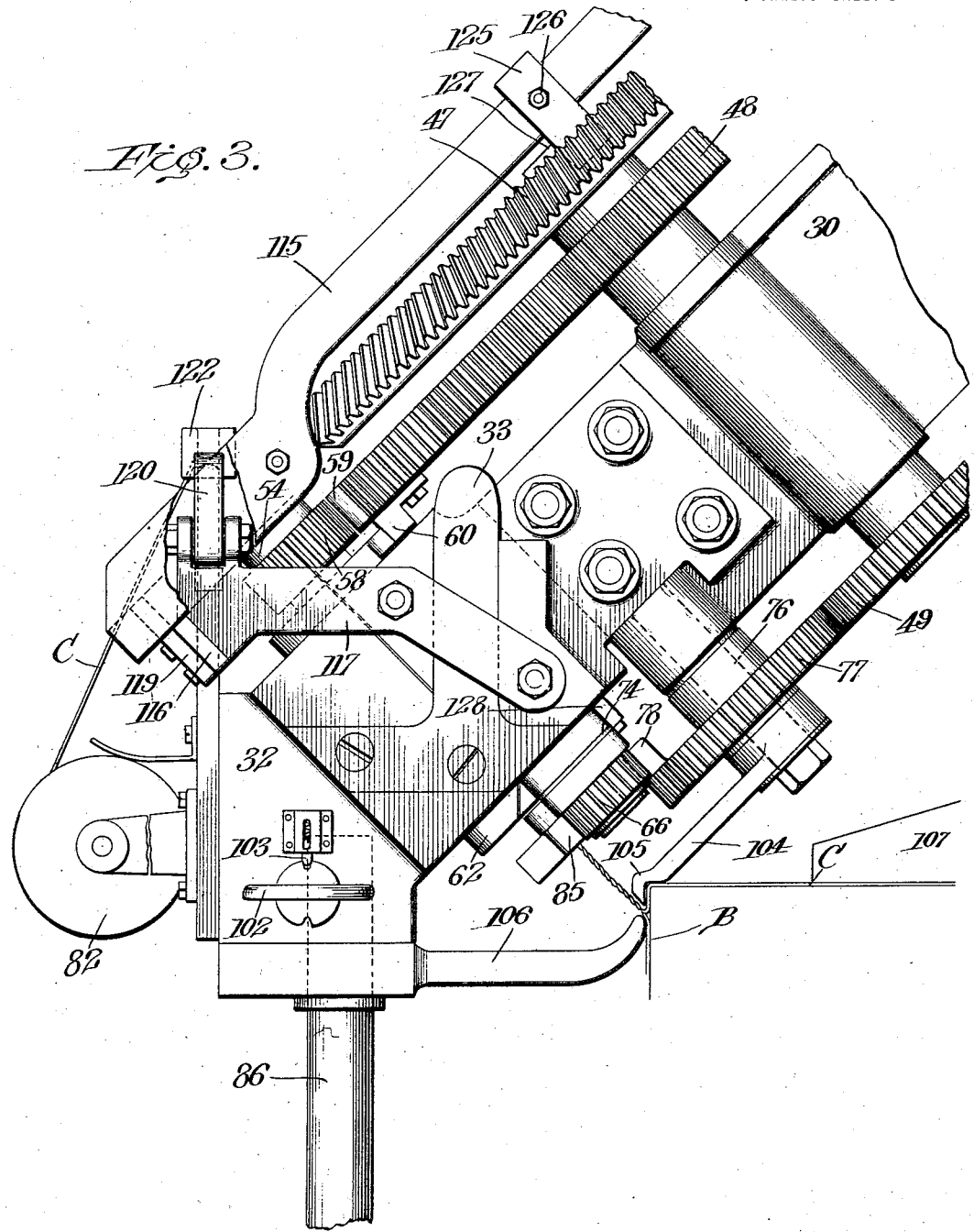

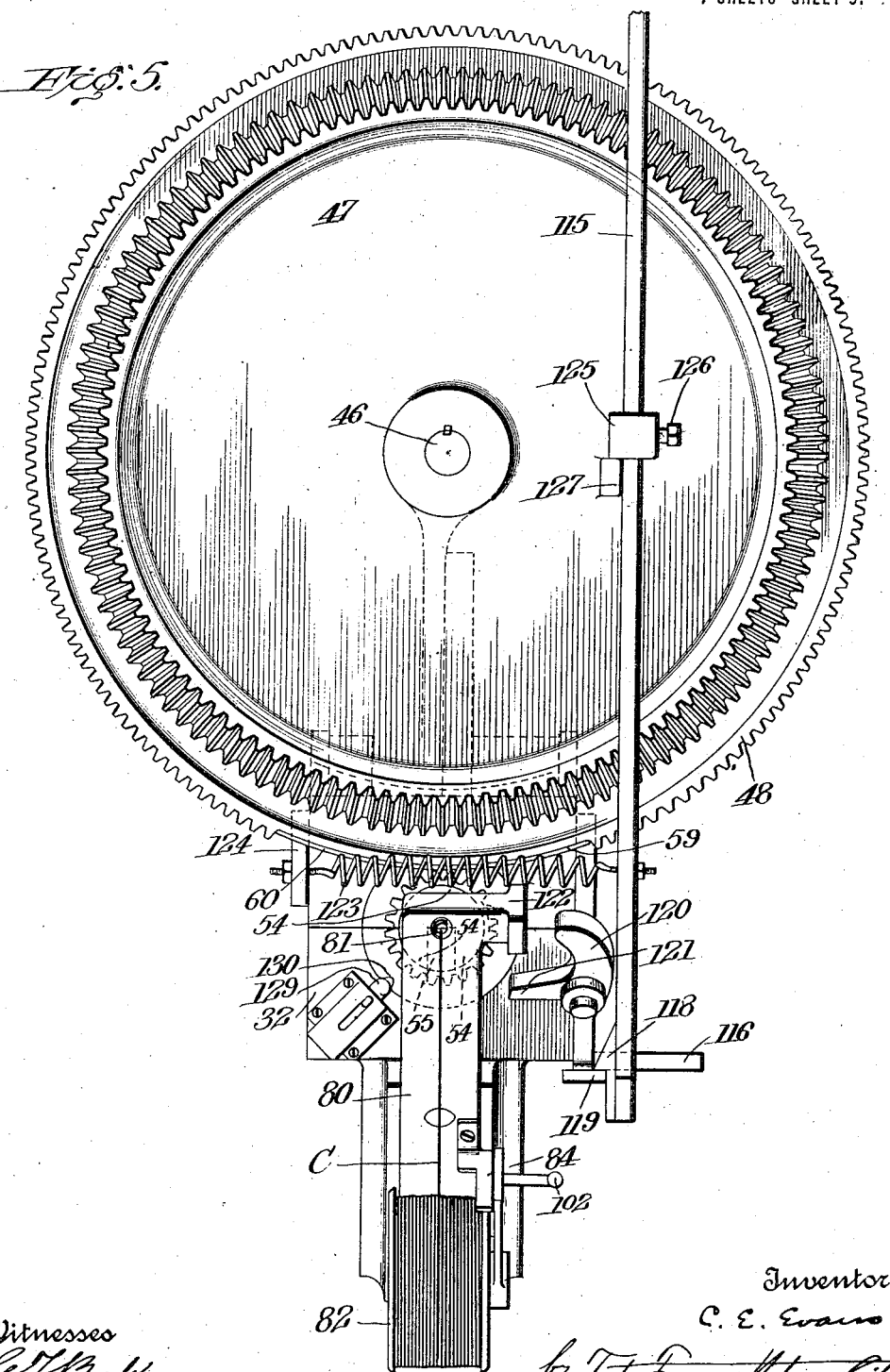

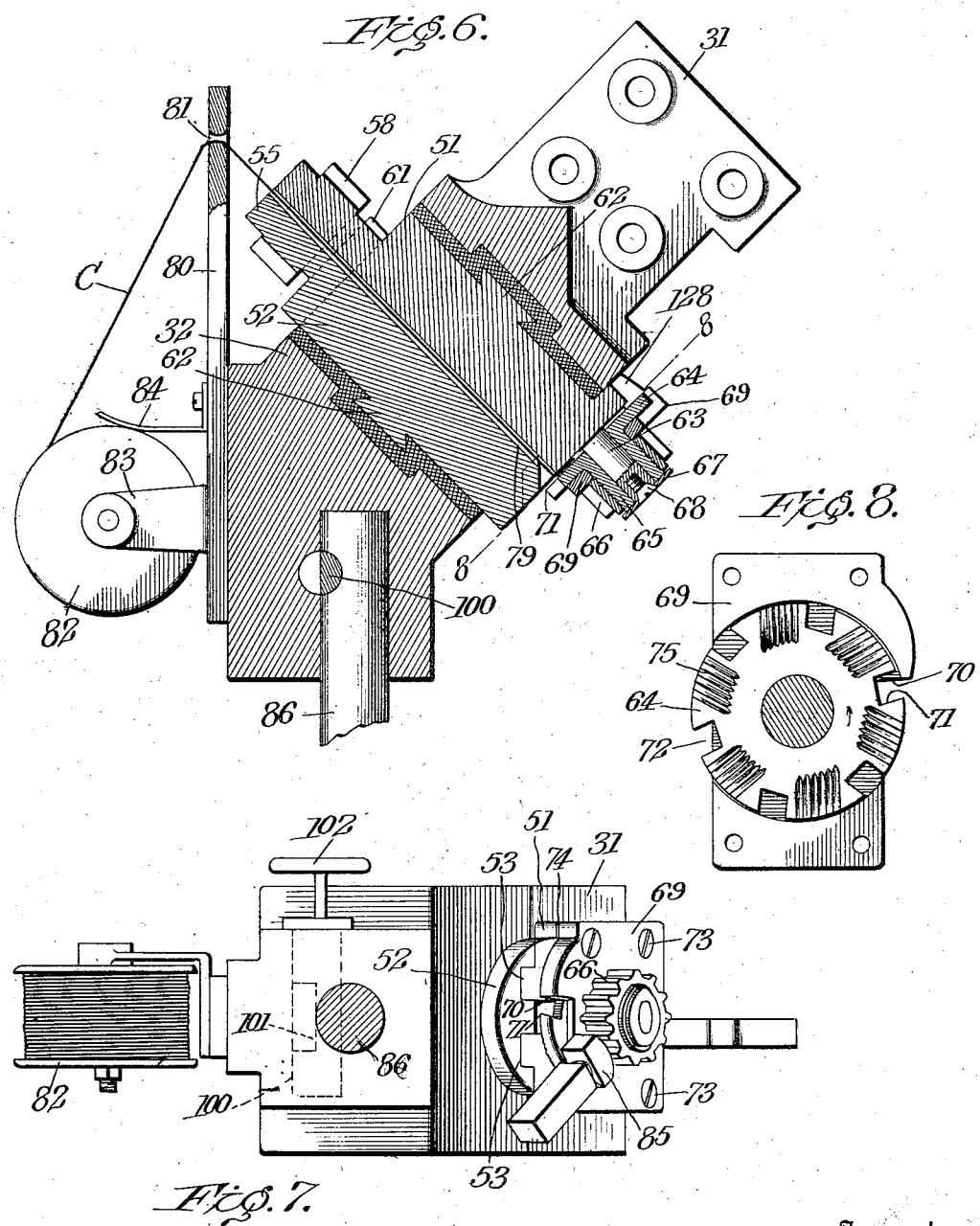

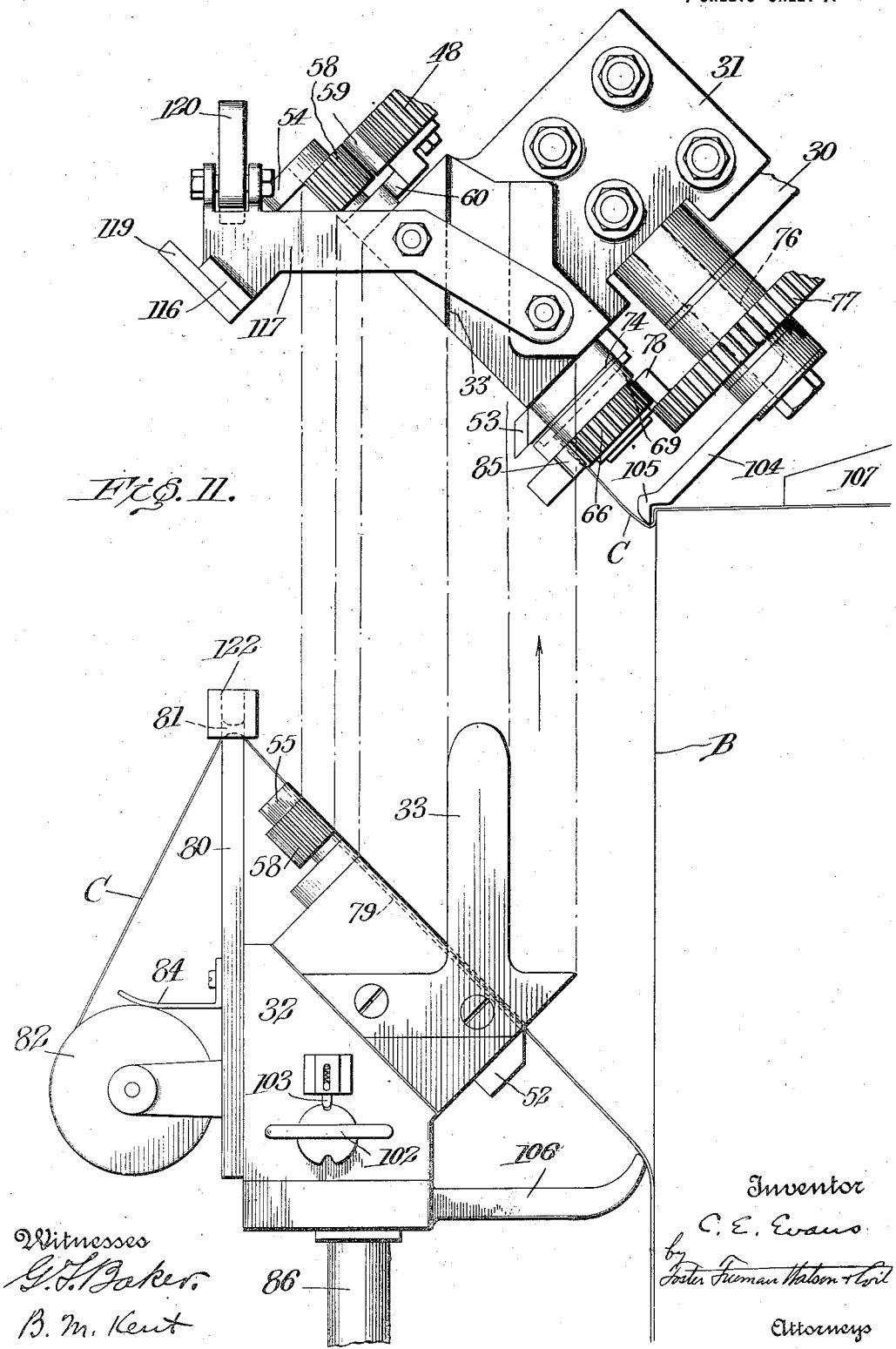

UNITED STATES PATENT OFFICE.

CHARLES E. EVANS, OF WEED, CALIFORNIA.

BINDING AND TYING MACHINE.

1,324,039. Specification of Letters Patent. Patented Dec. 9, 1919.

Application filed February 19, 1915, Serial No. 9,311. Renewed October 4, 1916. Serial No. 123,762.

*To all whom it may concern:*

Be it known that I, CHARLES E. EVANS, a citizen of the United States, residing at Weed, Siskiyou county, State of California, have invented certain new and useful Improvements in Binding and Tying Machines, of which the following is a specification.

This invention relates to bundling machines and more particularly to machines adapted to bind a package with wire and form a twist in the wire in order to secure it on the package.

An object of the invention is to provide a machine of this character which is of comparatively simple construction and which may be conveniently and rapidly operated.

A further object of the invention is to provide a machine of this character in which nearly all of the operations are performed automatically.

A further object is to provide a machine of this character which is readily adjustable to bind articles of different size and which is adapted to use different sizes of binding wire.

A further object is to provide a machine which will be capable of automatically severing the loop on the package from the supply section of binding wire and also secure the end of the binding wire, preparatory to making a new loop around a package.

With the above and other objects in view, as will appear from the following description, the invention may be embodied in various mechanisms, one form of which is illustrated in the accompanying drawings. In the drawings, Figure 1 is an elevation of the apparatus;

Fig. 2 is a plan view;

Fig. 3 is an enlarged side elevation of the twisting mechanism;

Fig. 4 is an elevation of the left hand side of Fig. 3;

Fig. 5 is a plan view of the mechanism shown in Figs. 3 and 4 and taken on a plane parallel with the large gears;

Fig. 6 is a vertical section through the twister and its bearing;

Fig. 7 is a bottom plan of the parts shown in Fig. 6;

Fig. 8 is a section on the line 8—8 of Fig. 6, looking downward;

Fig. 9 is a section on the line 8—8 of Fig. 6, looking upward;

Fig. 10 is an elevation of one of the details of the mechanism;

Fig. 11 is an elevation of the twisting mechanism with the parts thereof shown as separated and in the operation of arranging a binding wire on the package;

Fig. 12 is a perspective view of a package, with the binding wire thereon.

Referring to Fig. 12, it will be seen that the package which may be a bundle of lumber or a box or any other article is surrounded by a wire A, in the usual manner, and the wire has a common twist *a* formed therein, this twist being preferably arranged on one side of the package and not at the corner, although the machine, about to be described, could be used to form the binding wire with a twist at one corner of the package. When the twist is on the side of the package it is not so liable to be broken off as when on the corner.

Referring to Fig. 1, 20 indicates a floor or other suitable foundation or support and 21 a base plate which is secured to the floor 20 by means of bolts 22. The support 21 has secured thereto an upright tubular post 23 on the upper end of which there is a fixed bracket 24. A sleeve 25 surrounds the post 23 and is slidable thereon. This sleeve has secured thereto, on opposite sides thereof, and in parallel relation, a pair of channel beams 26. The channel beams 26 carry brackets 27 which support guide rods 28. The rods 28 have slidably arranged thereon a support 29 for the package B.

The bracket 24 carries an extension 30 to the outer end of which is secured the part 31 of a twopart bearing member for a revoluble twister. The other part 32 of this bearing member is interlocked with the part 31 by means of a pair of oppositely arranged tongues 33. A shaft 34 is supported in a bearing 35 on the bracket 24 and is provided with a driving pulley 36 or any other suitable means by which the shaft may be power operated. The extension 30 of the bracket 24 carries a bearing member 37 for a shaft 38 and a clutch 39 is arranged to form a driving connection between the shafts 34 and 38. The clutch 39 may be of any suitable construction and is shown as an ordinary cone clutch, the parts of which are pressed into engagement by a spring 40, coiled on the shaft 34. A shaft 41 carrying actuating arms 42 for the clutch 39, and a lever 43, is mounted in a bearing 44 on the bracket 24. By swinging the lever 43 upwardly the parts of the clutch 39 may be disengaged. The extension 30 carries a bearing 45 for the inclined shaft 46 on which are mounted the bevel gear 47, the mutilated gear 48 and the gear 49. A bevel pinion 50 is secured on the shaft 38 and meshes with the gear 47 so that when the parts of the clutch 39 are engaged the shaft 46 will be rotated by means of the pulley wheel 36.

The two-part twister, comprising the substantially semi-cylindrical parts 51 and 52, is supported in the bearing members 31 and 32. At its lower end the part 51 is provided with laterally projecting lugs 53 which engage in corresponding recesses in the part 52, and at its upper end the part 51 has a pair of lateral projections 54 which engage with an extension 55 on the part 52. In this way the parts 51 and 52 are locked together and caused to revolve as a unit. The parts 51 and 52 are provided with gear teeth 58 which form a gear adapted to mesh with the mutilated gear 48 so that the twister will be rotated by the gear 48. Arranged alongside of the mutilated portion 59 of the gear 48 is a segment 60, which is secured to the gear, and which is adapted to coöperate with a curved recess 61 in the part 51 of the twister to hold the latter against rotation when the teeth of the gear 48 do not mesh with the gear teeth 58.

The parts 51 and 52 of the twister are provided with dove tails 62 which are adapted to hold the parts against longitudinal or lateral movement in the bearing members. On the lower end of the part 51 of the twister is a stud 63 on which there is rotatably arranged a cutter disk 64 having an extension 65 on which is secured a pinion 66. At the outer end of the stud 63 there is secured a disk 67 by means of a screw 68. A housing 69 is provided for the cutter 64 and this housing has a cutting edge 70 which coöperates with the substantially radial cutting edges 71 of the disk to cut the binding wire. The cutting edges 71 are formed by making recesses 72 in the periphery of the disk. The housing 69 is secured to the part 51 of the twister by means of screws 73 and spaced slightly from the lower surface of the twister by means of shims 74 to permit a binding wire to be arranged between the disk 64 and the part 51. By varying the thickness of the shims 74 this space may be varied to suit different sizes of binding wire. The side of the disk 64 adjacent the member 51 is provided with a series of corrugations 75 which are adapted to engage the binding wire to draw it into the space, above referred to, in the manner to be hereinafter described.

The extension 30 carries a stud 76 on which is rotatably mounted an idler gear 77 which meshes with the gear 49. The gears 49 and 77 are of the same size and the gear 77 has arranged on one side thereof a lug 78 having teeth which are adapted to mesh with the pinion 66 so that the latter will be given a partial rotation on each revolution of the gear 77.

The twister is provided with an axial opening or groove 79 for the binding wire and the wire extends through this opening when the parts of the twister are united as shown in Fig. 6. The part 32 of the bearing member carries an upright bar 80 having an eye 81 in the upper part thereof to guide the binding wire, which extends from a spool 82 carried by a suitable bracket 83. In order to retard the spool 82 and put a certain amount of tension on the binding wire, which is indicated at C in Fig. 6, I have provided a spring 84 which engages the spool 82 and acts as a brake thereon. The binding wire C extends from the spool 82 through the opening 81 and the opening 79 in the twister and between the lower side of the part 51 and the disk 64, as shown in Fig. 6.

The extreme end of the binding wire C extends into one of the recesses 72 and in order to retain the cutter disk in the position to which it is rotated by the gear 77 and against the pull of the binding wire, I have provided a detent 85 which engages with the teeth of the pinion 66, as shown in Fig. 7.

Detachably connected with the part 32 of the bearing member for the twister is a piston rod 86 which carries a piston 87, arranged in a cylinder 88. The cylinder 88 may be supported in any suitable manner as on a post 89 and the opposite ends of the cylinder are preferably connected with oil or other liquid cylinders 90 and 91 by means of pipes 92 and 93, respectively. For the purpose of actuating the piston 87 the liquid in the cylinders 90 and 91 is forced into and out of the cylinder 88. In order to thus force this liquid, pipes 94 and 95 are connected with the cylinders 90 and 91, respectively, and lead to a four-way valve 96 or any other suitable controlling device for admitting a pressure fluid from a supply pipe 97 to either of the pipes 94 and 95 and to exhaust the fluid from these pipes to an exhaust pipe 98. The valve 96 has an operating handle 99 and when the valve is turned so as to admit the pressure fluid from the pipe 97 to the pipe 94 the liquid in the cylinder 90 will be forced through the pipe 92 into the cylinder 88, above the piston 87, and thus cause the latter to move downwardly. The piston 87 will force the liquid below it out through the pipe 93 into the cylinder 91 and the pressure fluid, which has previously been supplied to the cylinder 91, will be forced out through the pipes 95 and 98 to the exhaust. By supplying the pressure fluid from the pipe 97 to the pipe 95 the operation may be reversed and the piston 87 moved upwardly in the cylinder 88.

The rod 86 is detachably connected with the part 32 of the bearing member for the twister by means of a rotatable pin 100 which has a portion thereof cut out so as to be of substantially semi-circular cross section, as shown in Fig. 6. The cut away portion of the pin is indicated at 101 in Fig. 7 and it will be evident from this figure and Fig. 6 that the pin, in the position in which it is shown, forms a lock between the bearing member and the rod 86. When the pin is given a half revolution, however, the cut away part thereof permits the rod 86 to be detached from the bearing member 32. In order to operate the pin 100 it is provided with a handle 102 and a latch 103 is also provided to lock the pin in either position. (See Fig. 3.)

When the piston 87 and the rod 86 descend the bearing member 32 will be lowered, provided the rod 86 is locked thereto by means of the pin 100. As the part 32 separates from the part 31, the tongues 33 move out of the slots 33' therefor and the part 52 of the twister separates from the part 51. The relative arrangement of the parts, when separated, is shown in Fig. 11, but in this figure the binding wire is shown in the position it occupies when the rod 86 is moving upwardly so as to effect engagement of the bearing members 31 and 32 and the parts of the twister. From Fig. 11 it will be seen that the binding wire extends from the disk 64 around the package B and lies in the groove or opening 79, which, for convenience, is formed in the part 52 of the twister. As the bearing member 32, and the parts connected therewith, move upwardly from the position shown in Fig. 11, the binding wire is drawn from the spool 82. In order to guide the binding wire to the proper position on the side of the package an arm 104 is secured on the stud 76 and has its end 105 turned downwardly along the side of the package B. There is also secured to the lower part of the bearing member 32 an arm 106 which engages the wire C and coöperates with the arm 104, to cause the twist to be formed in the wire on the side of the package, as shown in Fig. 3.

In order to secure the package in position while the binding operation is being performed and also for the purpose of compressing the package, the sleeve 25 and the parts supported thereby are movable vertically. An arm 107 is secured to the bracket 24 and is adapted to engage the upper side of the package to form a stop therefor and prevent the bundle from interfering with the twisting mechanism. The sleeve 25, and the parts carried thereby, are raised to carry the package B into engagement with the arm 107, by means of a counter weight 108 which is connected with the sleeve 25 by means of a chain 109, this chain passing over a wheel 110 on the post 23 and being connected with the sleeve at 111. From Fig. 1 it will be evident that the weight 108 will hold the package B in engagement with the arm 107 while the binding operation is taking place. In order to release the package B it is necessary to lower the sleeve 25 and for this purpose a lever 112 is fulcrumed on a bracket 113 and has one end connected with the chain 109. The opposite end of the lever 112 is formed as a yoke which spans the rod 86 and is adapted to be engaged by a collar 114 on the rod as the rod reaches the limit of its descending movement. The engagement of the collar 114 with the lever 112 causes the latter to be moved to the position indicated in dotted lines in Fig. 1, and thus raise the weight 108, and permits the sleeve 25 to drop a corresponding amount. When the rod 86 is at the lower limit of its movement the bearing member 31 is in the position indicated in dotted lines in Fig. 1, and the package, having been lowered away from the arm 107, may be removed from the support 29 and the latter moved to the dotted position in Fig. 1.

Referring to Figs. 1 and 2, it will be seen that the support 29 comprises the plates 29' and uprights 29'', secured on the plates 29' and connected by the cross member 29'''. The uprights 29'' and the cross member 29''', in plan, constitute a U-shaped structure.

In the operation of the machine, the normal inoperative position of the package support 29 is indicated in dotted lines in Fig. 1 and in binding a bundle the bundle is placed on the package support and the bearing member 32, with the part 52 of the twister thereon, is lowered to the dotted line position, in Fig. 1, and a binding wire then extends from the cutter disk 64 downwardly to the eye 81 of the bar 80. The package and its support are then moved toward the post 23, to the position shown in full lines in Fig. 1, and in thus moving the package the binding wire is engaged by the package and drawn from the spool 82 so as to extend along the top, right side, and bottom of the package. The valve 96 is then operated to raise the piston 87 and the bearing member 32 to the full line position in Fig. 1, where the bearing member is interlocked with the part 31 and the parts 51 and 52 of the twister are also interlocked. As the bearing member 32 rises, the binding wire is paid out from the spool 82 and arranged along the left side of the package, the wire being guided by the arm 106. The parts of the twisting mechanism are then substantially in the positions shown in Fig. 3.

When the parts of the twister are coupled together the twister is rotated and, in order to start the rotation automatically, a rod 115 is connected at its upper end with the arm 43 which actuates the clutch 39. The lower end of the rod 115 is supported on a bracket 116 which is an extension of a bracket 117 secured to the bearing member 31. The rod 115 carries a latch 118 which engages an extension 119 of the bracket 117, as shown in Figs. 4 and 5. A tripping lever 120 is pivotally arranged on the bracket 117 and has an upward extension alongside the rod 115. The lever 120 has a laterally extending arm 121 which is adapted to be engaged by an extension 122 on the bar 80 as the latter approaches the limit of its upward movement. The engagement of the extension 122 with the arm 121 of the lever 120 tilts the lever and the upward extension of the lever engages the side of the rod 115 and pushes the rod laterally so as to disengage the latch 118 from the part 119. The latch 118 is normally held in engagement with the part 119 by a coiled spring 123 which has one end connected with the rod 115 and the opposite end connected with a bracket 124 secured to the bearing member 31. The rod 115 carries a stop 125 which is adjustable along the rod and adapted to be secured in any position by means of a set screw 126. The bevel wheel 47 has an upwardly projecting lug 127 which engages the stop 125 for a purpose to be hereinafter described. When the rod 115 is pushed sidewise by the lever 120, the stop 125 is disengaged from the lug 127 and the rod 115 is then free to move downwardly to permit the parts of the clutch 39 to be thrown into engagement by the spring 40. As soon as the parts of the clutch 39 are thrown into engagement, the bevel pinion 50 begins to rotate and in turn rotates the gear 47 and the shaft 46. The gears 48 and 49, being rigidly connected with the shaft 46, are also rotated and as soon as the teeth of the gear 48 mesh with the teeth 58 on the split gear attached to the twister, the twister will be rotated. When the parts of the twister are being coupled together, the binding wire is laid in the groove 79 and in one of the recesses 72 of the cutter disk, the anchored end of the wire having also been laid in this same recess when the parts of the twister were separated. The rotation of the twister causes the two strands of the binding wire to be twisted together between the package and the lower end of the twister, as shown in Fig. 3. The gear 48 has one-eighth of its teeth cut away and the number of teeth remaining on the gear 48 is seven times the number of teeth 58 on the twister, so that in one revolution of the gear 48 the twister will be revolved seven times. Upon the completion of the seventh revolution of the twister the segment 60 on the gear 48 engages the cut away part 61 of the twister and holds the latter against further rotation. It will be noted that during the revolution of the twister the cutter disk and the parts associated therewith are carried with the twister. While the gear 48 is making a revolution the gear 77 is also making a revolution and after the twister has completed the seventh revolution the teeth on the lug 78 engage with the teeth of the gear 66 and the latter and the cutter disk 64 are given a partial rotation. On account of the two strands of the binding wire extending through the recess 72 in the cutter disk, the rotation of the cutter disk will cause the twist in the binding wire to be gripped between the cutting edges 70 and 71 and cut off, thus separating the wire on the package from the supply section of the binding wire which extends through the groove 79 to the spool 82.

It will be seen that on account of the cutting edges 70 and 71 being at the lower surface of the disk 64, a short section of the twist will be carried around in the recess 72 between the lower surface of the part 51 of the twister and the housing 69. The cutter disk 64 is rotated the angular distance between two of the recesses 72 so that, upon completion of the rotary movement, the disk will be in substantially the position shown in Fig. 8 and ready for another operation of the mechanism. The carrying of the end of the binding wire into the space between the cutter disk and the lower surface of the part 51 of the twister causes the end to be automatically secured to the twister after the cut has been made and upon each succeeding operation of the mechanism the binding wire is carried around with the disk 64 and therefore it is necessary to provide some means for removing the waste ends which are carried with the disk. For this purpose there is provided a cutter 128 on the part 51 of the twister and this cutter coöperates with the upper surface of the disk and severs the binding wire at the point where it bends from the space between the disk and the lower surface of the part 51, into the recess 72. The cutting of the waste ends at this point causes the parts to be freed from the cutter disk and fall out of the mechanism.

After the binding wire has been severed so as to detach the package from the supply section of the binding wire, the valve 96 is actuated to effect the lowering of the piston 87 and the bearing member 32. When the piston 87 approaches the limit of its lowering movement, the collar 114 engages the lever 112 and raises the weight 108 so as to permit the sleeve 25, with the package and other parts supported thereby, to be lowered away from the arm 107. The package may then be removed from the support 29 without moving the latter to the dotted line position in Fig. 1. If, however, it is desired to return the support 29 with the package thereon to the dotted line position, before removing the package, the rod 86 is detached from the bearing member 32 before the rod 86 is lowered, by rotating the pin 100, in the manner herein above described, and then, after the rod 86 has been lowered, the support 29 with the package thereon may be moved outwardly to the dotted line position and the package removed and another package placed on the support. The rod 86 is then raised and connected with the bearing member 32 and lowered to carry the latter to the dotted line position so as to stretch the binding wire across the path of the package and the latter is moved inwardly with the support 29. The operation of binding the package may then be repeated in the manner above described.

As the gear 47 completes its revolution, which is during the operation of the cutter disk 64, the lug 127 engages with the stop 125 and moves the rod 115 upwardly to disengage the parts of the clutch 39 and stop the mechanism. The gear 47 rotates sufficiently, after the engagement of the lug 127 with the stop 125, to effect the engagement of the latch 118 with the part 119, thus restoring the mechanism to the position in which it is ready for the succeeding operation.

In order to hold the part 52 of the twister against turning movement, when detached from the part 51, a spring-pressed latch 129 is provided on the bearing member 32 and adapted to engage a notch 130 in the part 52. (See Fig. 5).

Having thus described the invention, what is claimed and desired to be secured by Letters Patent is:

1. In apparatus of the class described, the combination of means for supporting a package, a rotary twister for the ends of a binding wire, a mutilated gear for rotating said twister, a rotary cutter carried by said twister and having its axis parallel with the axis of the twister but offset therefrom, and means rotating with said gear and adapted to actuate said cutter after a plurality of rotations of said twister.

2. In apparatus of the class described, the combination of means for supporting a package, a rotary twisting member separable into two parts, means on each of said parts for independently holding a binding wire with a portion thereof surrounding the package, and means for rotating said parts simultaneously to form a twist in the binding wire.

3. In apparatus of the class described, the combination of means for supporting a package, a rotary twisting member separable into two parts, means on each of said parts for independently holding a binding wire, means for separating said parts to permit the binding wire to be looped around the package, and means for rotating said parts simultaneously to form a twist in the binding wire.

4. In apparatus of the class described, the combination of a movable support for a package, a two-part twister, means on each of said parts for independently holding a binding wire, means for moving one of said parts across the path of the package to arrange a wire thereacross, and means for rotating said parts simultaneously, when united, to form a twist in the wire.

5. In apparatus of the class described, the combination of a movable support for a package, a two-part twister, means on each of said parts for independently holding a binding wire, a movable support for one part of said twister adapted to carry said part across the path of the package and return in the rear of the package to arrange the wire therearound, and means for rotating said twister to form a twist in the wire.

6. In apparatus of the class described, the combination of a movable support for a package, a two-part twister, means on each of said parts for holding a binding wire, a movable member detachably connected with one part of said twister and adapted to carry said part across the path of the package and return in the rear of the package to arrange the wire therearound, and means for rotating said twister to form a twist in the wire.

7. In apparatus of the class described, the combination of a movable support for a package, a two-part revoluble twister, a two-part bearing member for said twister, a movable member connected with one of the parts of said bearing member and adapted to carry the same, with one of the parts of said twister, across the path of the package and return in the rear of the package, and means for revolving said twister.

8. In apparatus of the class described, the combination of a support for a package, a two-part revoluble twister, means associated with each of the parts of said twister for independently holding a binding wire, means for separating the parts of said twister to permit the binding wire to be arranged on the package, and means for revolving said twister.

9. In apparatus of the class described, the combination of a support for a package, a two-part revoluble twister, means associated with each of the parts of said twister for holding a binding wire, a two-part bearing member for said twister, movable means connected with one of the parts of said bearing member for separating the parts of the bearing member and twister to permit the binding wire to be arranged on the package, and means for revolving said twister.

10. In apparatus of the class described, the combination of a support for a package, a two-part revoluble twister, means carried by one of said parts for holding a binding wire, a two-part bearing member for said twister, one of which parts is fixed and the other movable, means carried by one of the parts of the bearing member for holding the binding wire, means for moving the movable part of said bearing member to separate the parts of said twister so as to permit the binding wire to be arranged on the package, and means for revolving said twister.

11. In apparatus of the class described, the combination of a support for a package, a two-part revoluble twister, means carried by one of said parts for holding a binding wire, a two-part bearing member for said twister, one of which parts is fixed and the other movable, means carried by the movable part of said bearing member for holding the binding wire, means for moving said movable part to separate the parts of said twister so as to permit the binding wire to be arranged on the package, and means for revolving said twister.

12. In apparatus of the class described, the combination of a support for a package, a two-part revoluble twister, means carried by one of said parts for holding a binding wire, a cutter for the binding wire carried by one of said parts and movable independently thereof, means for separating the parts of said twister to permit the binding wire to be arranged on the package, means for revolving the twister, and means for actuating said cutter.

13. In apparatus of the class described, the combination of a support for a package, a two-part revoluble twister, a two-part gear, the parts of which are rigidly attached to the parts of said twister, a gear wheel arranged to mesh with said gear on the twister, means whereby the parts of said twister are separated to permit the binding wire to be arranged on the package, and means for rotating said gear wheel when the parts of the twister are united.

14. In apparatus of the class described, the combination of a revoluble twister, a gear wheel rigidly connected with said twister, a gear adapted to mesh with the first mentioned gear, a rotary cutter, and power-operated means for simultaneously rotating the second mentioned gear and said cutter.

15. In apparatus of the class described, the combination of a support for a package, a two-part revoluble twister, a two-part bearing member for said twister, normally idle power-actuated means for revolving said twister, means for separating the parts of said twister and bearing member to permit the binding wire to be arranged on the package, a movable member adapted to control said power-actuated means, a latch for holding said member when said power-actuated means is idle, a lever for disengaging said latch, and means carried by said separating means for actuating said lever.

16. In apparatus of the class described, the combination of a support for a package, a two-part revoluble twister, a two-part bearing member for said twister, normally idle power-actuated means for revolving said twister, means for separating the parts of said twister and bearing member to permit the binding wire to be arranged on the package, a movable member adapted to control said power-actuated means, a latch for holding said member when said power-actuated means is idle, a lever for disengaging said latch, means carried by said separating means for actuating said lever, and means for automatically moving said movable member to engage said latch and stop said power-actuated means.

17. In apparatus of the class described, the combination of a revoluble twister, a gear wheel for revolving said twister, normally idle power-actuated means for rotating said gear wheel, a member for controlling said power-actuated means, a latch for normally holding said member when said power-actuated means is idle, automatically actuated means for releasing said latch to permit said member to be moved so as to set said power-actuated means in operation, and means rotatable with said gear wheel and adapted to engage said member to move the member so as to effect the engagement with said latch and stop said power-actuated means.

18. In apparatus of the class described, a two-part revoluble twister, a two-part bearing member for said twister, a two-part gear the parts of which are rigid with the parts of said twister, and a gear wheel adapted to engage said two-part gear to revolve the twister.

19. In apparatus of the class described, the combination of a two-part revoluble twister, a two-part bearing member for said twister, each of the parts of said twister having a circumferential dove tail thereon whereby it is held in one of the parts of the bearing member when the bearing member parts are separated, and means for revolving the twister.

20. In apparatus of the class described, the combination of a two-part revoluble twister, a two-part bearing member for said twister, a mutilated gear, gear teeth on each of the parts of said twister, coöperating to form a complete gear, means carried by said mutilated gear and coöperating with a recess in one of the parts of the twister to hold the latter against rotation when the parts of the twister are separated, and means carried by one of the parts of said bearing member for engaging the other of said twister parts to hold the latter against rotation.

21. In a machine of the class described, in combination, a two-part twister, one part being movable toward and from the other part, and means controlled by the movement of said movable twister part for compressing a bundle in the machine.

22. In a machine of the class described, in combination, twister mechanism, a support slidably mounted to carry a bundle to and from the machine, and means controlled by the movement of a member of the twister mechanism to move the support to compress the bundle.

23. In a machine of the class described, in combination, a post, a bundle support mounted to slide to and from the post and also to move along the post to compress the bundle, and means to move the support in the last mentioned direction.

24. In a machine of the class described, in combination, a post, a bundle support mounted to slide to and from the post and also to move along the post to compress the bundle, and means carried by the post to move the support in the last mentioned direction.

25. In a machine of the class described, in combination, a post, twisting mechanism and means carried by the post to compress the bundle controlled by the movement of the twisting mechanism.

26. In a machine of the class described, in combination, twister mechanism, and means for compressing a bundle in the machine controlled by the movement of a part of the twister mechanism.

27. In a machine of the class described, in combination, means for moving a bundle to operative position in the machine, means to carry a binder across the path of and in front of the bundle and then upward in rear of the same and means to compress the bundle controlled by the movement of the binder carrying means.

28. In a machine of the class described, in combination, means for wrapping a wire around a bundle and means to compress the bundle controlled by said first mentioned means.

29. A binding and tying machine including in combination a movable support for the bottom of the bundle, a weight acting to force said support upward, and means engaging the top of the bundle resisting said movement.

30. A binding and tying machine including in combination, means to carry the bundle to operative position in the machine, means acting to force the bundle upward, means engaging the bundle to resist said movement, means to arrange a binder around the bundle, and means to twist together and cut the ends of the binder.

31. A binding and tying machine, including in combination a support for disposing the bundle in operative position in the machine, means acting on one side of the bundle to force the bundle toward the opposite side, means engaging said latter side to resist said first means, means on the support engaging another side of the bundle to maintain said side flat, means for arranging a binder around the bundle and means for tying and cutting said binder.

32. A binding and tying machine including in combination, a post, a frame on said post, a bundle support slidable on said frame to carry a bundle to operative position in the machine, means to carry a binder across the path of said support in advance of the bundle, means to carry the binder across said path in rear of the bundle, and means to tie and cut said binder.

33. A binding and tying machine including in combination, a post, a frame on said post, a bundle support slidable on said frame to carry a bundle to operative position in the machine, means for compressing the bundle, means to carry a binder across the path of said support in advance of the bundle, means to carry the binder across said path in rear of the bundle, and means to tie and cut said binder.

34. A binding and tying machine including in combination, a slidable bundle support to carry the bundle to operative position in the machine, means to carry a binder across the path of the bundle in advance thereof and back in rear of the same, means to compress the bundle controlled by the movement of said first means, and means to tie and cut the binder.

35. A binding and tying machine including in combination, a slidable bundle support to carry the bundle to operative position in the machine, means to arrange a binder around the bundle, automatically operated means to compress the bundle, and means to tie and cut the binder.

36. In a machine of the class described, a two part twister, one part movable to and from the other, a compressor, and means actuated by the movement of said movable twister part for controlling the compressor.

37. In a binding and tying machine, the combination of a revoluble twister and gear wheel for revolving said twister, normally idle power actuated means for rotating the said gear wheel, a member for controlling said power actuated means, means for normally holding said member when said power actuated means is idle, and automatically actuated means for releasing said holding means to permit said member to be moved so as to set the power actuated means in operation.

38. In a binding and tying machine, in combination, means for moving the bundle into the machine, a cylinder arranged at an angle to the path of the bundle, a wire carrier including a rod and piston associated with said cylinder, and means for controlling the supply of a pressure fluid to said cylinder.

39. In a machine of the class described, in combination, a base having a vertical post, a horizontally movable bundle carrier, a vertical cylinder having a piston slidable therein and a wire carrier connected thereto for movement across the path of the bundle, and means for controlling the supply of pressure fluid to said cylinder to actuate the piston.

40. A binding and tying machine including in combination, a movable bundle support, a member engaging the top of the bundle, means acting to force the bundle against said member, a twisting mechanism positioned above the bundle support, a binder carrying member coacting with the twisting mechanism traveling in a path intersecting the path of the bundle support and a cutting member coacting with the twisting mechanism.

41. A binding and tying machine including in combination, a movable bundle support, twisting mechanism arranged above the support, means coacting with the twisting mechanism for arranging a binder around the bundle, and a bundle engaging member arranged to prevent the bundle interfering with the twisting mechanism.

42. In a machine of the class described, in combination, twisting mechanism, a wire carrier movable to and from said twisting mechanism, means for compressing the bundle, and means actuated by the movement of said carrier for controlling said compressing means.

43. A binding and tying machine including in combination, a post, a frame on said post, a bundle support slidable on said frame to carry the bundle to operative position in the machine, and means to move the frame to compress the bundle.

44. A machine of the class described including in combination, a vertical post, a bracket at the top thereof, a rotary twister supported by said bracket with its axis inclined to the vertical, and a binder carrier vertically movable to and from said twister.

In testimony whereof I affix my signature in presence of two witnesses.

CHARLES E. EVANS.

Witnesses:
J. A. EKWALL,
JAMES G. COTCHETT.